ROTARY SCANNER SWITCH

Filed Dec. 12, 1960 2 Sheets-Sheet 1

INVENTOR.
IRVIN W. BORUTZKE.
BY
Wallace P. Lamb
ATTORNEY.

ROTARY SCANNER SWITCH

Filed Dec. 12, 1960 2 Sheets-Sheet 2

INVENTOR.
IRVIN W. BORUTZKE
BY
Wallace P. Lamb
ATTORNEY.

United States Patent Office 3,121,142

Patented Feb. 11, 1964

3,121,142

ROTARY SCANNER SWITCH

Irvin W. Borutzke, Detroit, Mich., assignor to Burroughs Corporation, Detroit, Mich., a corporation of Michigan Filed Dec. 12, 1960, Ser. No. 75,235
4 Claims. (Cl. 200—11)

This invention relates generally to switches and particularly to rotary scanner switches.

It is the general object of the present invention to provide an improved scanner or rotary switch mechanism.

Another object of the invention is to provide for a verification system, an improved rotary scanner switch of a character for successively scanning a plurality of information representing electrical contacts while maintaining a closed circuit irrespective of the angular position of the rotary scanning contacts of the switch.

A further object of the invention resides in the provision of an improved rotary scanner switch unit in which the scanning of a relatively large number of contacts is limited to a relatively small segment of the rotary path of a rotary scanning contact without need of proportionately increasing the size of the unit.

Other objects of the invention will become apparent from the following description, taken in connection with the accompanying drawings in which.

Figure 1:
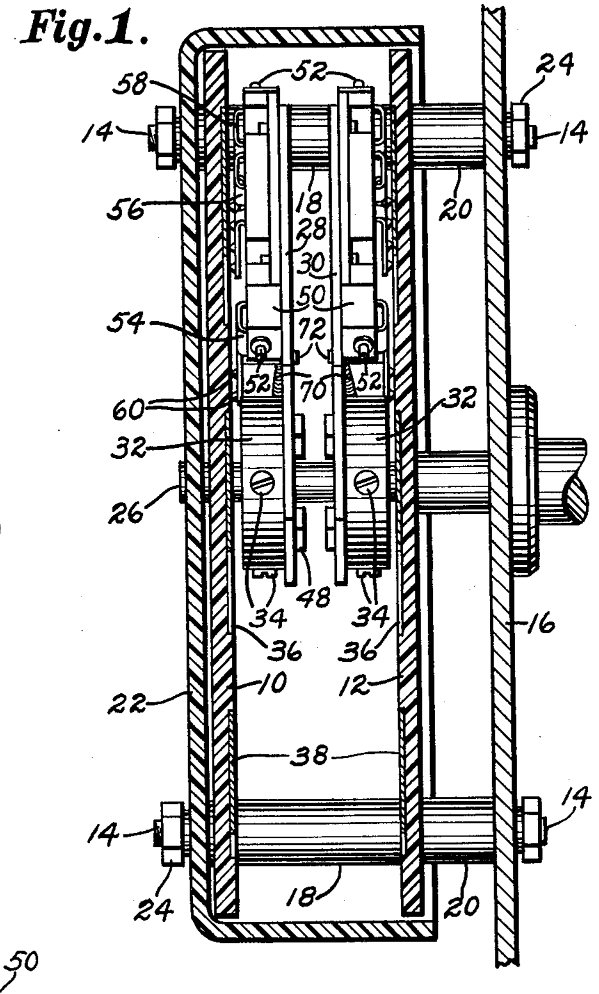
FIG. 1 is a sectional view of a scanner switch, embodying features of the invention.
Figure 4:
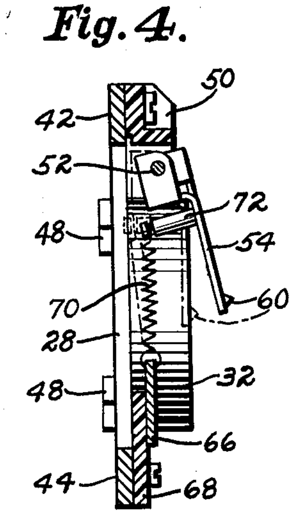
FIG. 4 is a sectional view taken along the line 4—4 of FIG. 3.
Figure 3:
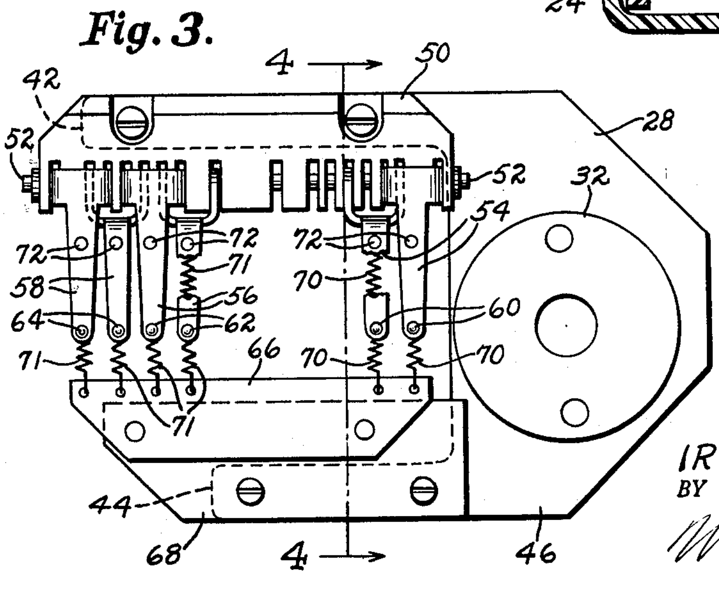
FIG. 3 is an enlarged elevational view of a component of the scanner switch shown removed therefrom.

Referring to the drawings by characters of reference, the scanner switch device shown includes a pair of oppositely disposed parallel mounting boards 10 and 12 through which extend bolts 14 for mounting the device on a suitable support 16. The bolts 14 extend through tubular spacers 18 which space the boards 10 and 12 apart and through other tubular spacers 20 which space the scanner switch as a unit from the support 16. Enclosing the mounting boards 10 and 12 there is a cover 22 through which the bolts 14 extend, and nuts 24 threaded onto opposite ends of the bolts hold the mounting boards 10, 12, cover 22 and the spacers 18 and 20 together and to the support 16.

Figure 2:
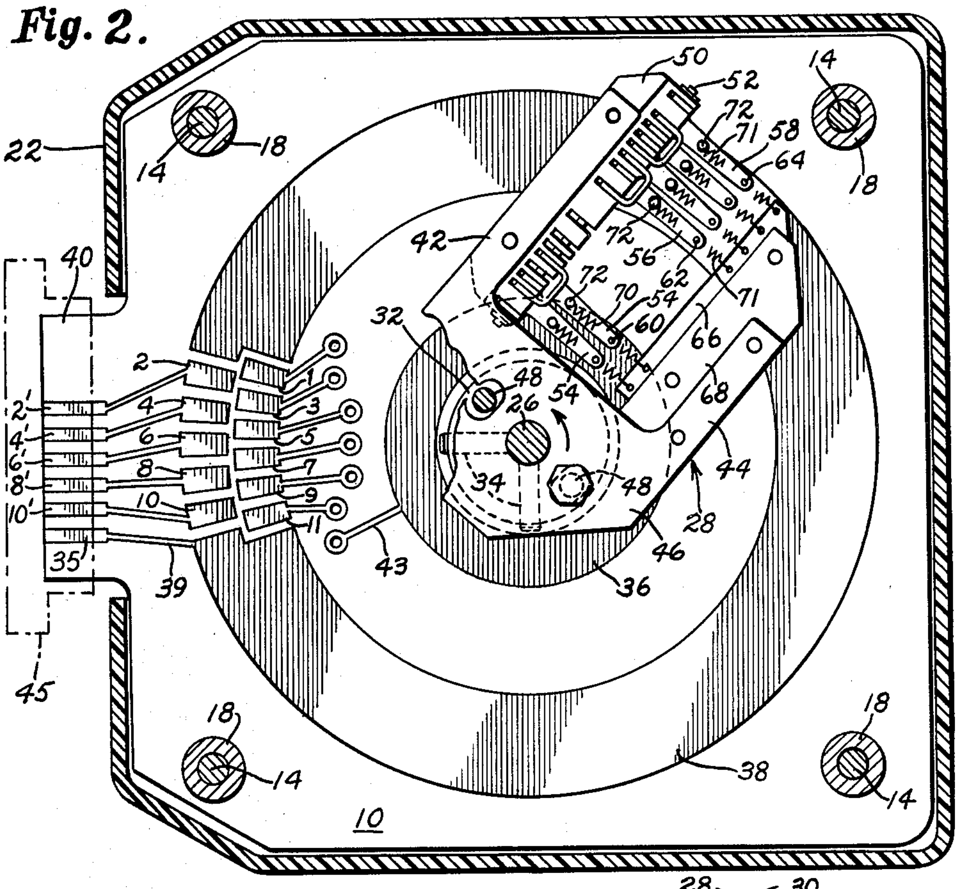
FIG. 2 is a vertical sectional view, partly in elevation, of the scanner switch.
Figures 5, 6:
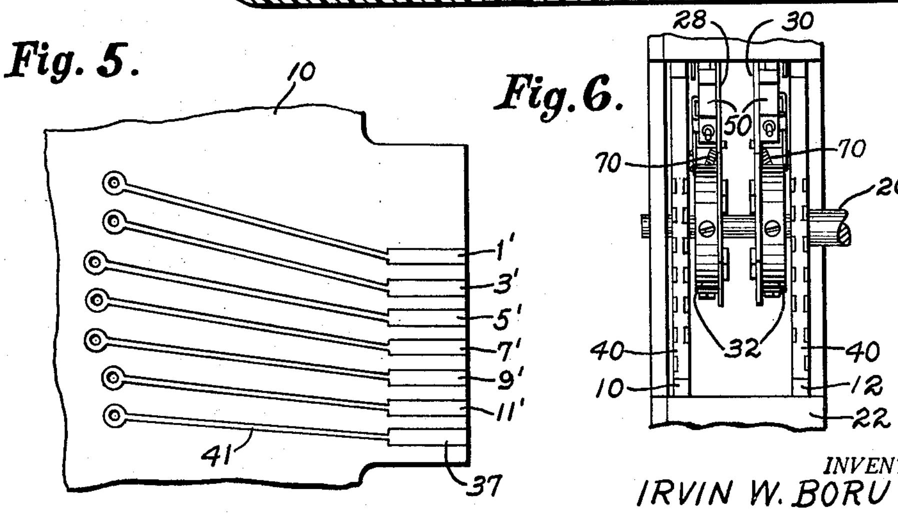
FIG. 5 is an enlarged fragmentary detail view.
FIG. 6 is a fragmentary side view.

A pair of aligned apertures are provided in the mounting boards 10 and 12, substantially centrally thereof, to receive a driven shaft 26 on which is affixed a pair of rotatable arms 28 and 30 for the circuit boards 10 and 12 respectively. In operation, the shaft 26 is to be cyclically operated through one revolution. The arms 28 and 30 are spaced apart between the boards 10 and 12 and have hubs 32 which are suitably secured to the shaft 26, such as by means of set screws 34. The arms 28 and 30 rotate together from the same starting position on cycling operation of the shaft and rotate through 360° back to the starting position. This position is shown in FIG. 2.

The mounting boards 10 and 12 may be made of any suitable dielectric material, such as a thermoplastic material or thermosetting resin. Mounted respectively on the inwardly facing surfaces of each of the boards 10 and 12 is a pair of annular contacts including an inner contact or bus 36 and an outer contact or bus 38. These busses, 36 and 38, are preferably concentric with respect to each other and with the axis of the driven shaft 26, and are affixed flat against and preferably flush with the surfaces of the boards 10 and 12. The inner bus 36 is a continuous ring, whereas the outer bus 38 is interrupted such that the ends of the bus 38 are spaced apart, as shown. In the present device, the ends of bus 38 are spaced apart an arcuate distance of about 36°. Positioned between the ends of the outer bus 38 there is a plurality of fixed contacts designated 1 to 11 respectively. In order to confine the contacts 1 to 11 to a small or 36° arcuate area, they are arranged in two groups which include an arcuately aligned inner group, designated by the numerals 1, 3, 5, 7, 9 and 11, and an arcuately aligned outer group designated by the numerals 2, 4, 6, 8, and 10. As shown, the two groups of contacts are preferably located within the confines of the annulus defined by the outer bus 38. Further, the contacts 1 to 11 are radially and equally spaced apart with the contacts of the groups offset or in staggered relation to each other.

Adjacent its contacts 1 to 11, each of the boards 10 and 12 has an extended portion 40 that projects through an opening in the cover 22 providing a terminal block for each board. Spaced apart terminals 1′ to 11′ are provided on each of the blocks respectively for the contacts 1 to 11, the terminals being distributed in two groups having, in this instance, five contacts on one side of the block and six on the other. As shown, the contacts 1, 3, 5, 7, 9 and 11 are connected respectively by leads to eyelet connections that extend through the boards for connection on the other side by leads to the corresponding terminals 1′, 3′, 5′, 7′, 9′ and 11′ of the group of six terminals. Additional terminals 35 and 37 are provided respectively on opposite sides of each of the terminal blocks 40, the terminal 35 being connected by a lead 39 to the bus 38, and the terminal 37 being connected by a lead 41, through the board and lead 43 to the bus 36. The terminal blocks 40 are adapted to receive a suitable connector 45, such as any of the well known socket type connectors.

The rotary contact carrying arms 28 are alike and each comprises a U-shaped member or plate including spaced apart parallel legs 42 and 44 and a joining web 46. The hub 32 may be secured to the web 46 by any suitable means, such as screws 48. On leg 42 and facing the circuit board 10 there is an elongated block 50 of dielectric material which extends substantially coextensive of leg 42 and has a bore longitudinally therethrough for supporting a fixed shaft 52. Pivotal on the shaft 52 are three pairs of current conducting resilient switch arms 54, 56, and 58 which extend laterally from the block 50 toward the leg 44 of the U-shaped mounting 28 and at their free ends carry contacts 60, 62 and 64, respectively, which are in alignment radially with the axis of shaft 26. The contacts 60, 62 and 64 are preferably provided in pairs so that in the event of failure of one of the contacts of a pair, the other contact of the pair will in all probability function. The contact arms 54, 56 and 58 may be made of any suitable electric conducting material, such as copper. As shown, the pair of contact arms 54 are arranged on the shaft 52 such that the contacts 60 carried thereby wipe the inner annular bus 36. Similarly, the two pair of contact arms 56 and 58 are arranged such that their contacts 62 and 64 wipe the outer bus 38 and such that contacts 62 will wipe the fixed contacts 1, 3, 5, 7, 9, and 11 and contacts 64 the fixed contacts 2, 4, 6, 8 and 10. In addition, by arranging the contacts of each group such that the distance between adjacent contacts is less than the widths of the contacts and by arranging the fixed contacts of the two groups in staggered relation, it will be seen that the circuit will not be broken when the contacts 62 and 64 respectively wipe the two groups of contacts. For example, by reference to FIG. 2, it will be seen that before the contacts 64 leave the bus 38, contacts 62 have engaged fixed contact "1" and before contacts 62 leave the fixed contact "1," contacts 64 have engaged fixed contacts "2," etc.

Mounted on the leg 44 of the U-shaped arm 28 there is a bridging member or terminal 66 of suitable current conductive material, such as phosphorous bronze, which is insulated from the leg 44 by a block of dielectric material 68 such as a phenolic material. The contact carrying arms 54 are electrically connected to the bridging member 66 by a pair of leads 70 in the form of tension springs which also function to yieldingly urge the contacts 60 into engagement with the inner bus 36. Similarly, the contact carrying arms 62 and 64 are electrically connected to the bridging member 66 by current conducting springs 71 which urge the contacts 62 and 64 into wiping relationship with the outer bus 38 and the contacts 1 to 11. Each of the contact carrying arms 54, 56, and 58 has a current conducting pin 72 attached thereto and the springs 70 have corresponding ends respectively attached to the pins and their other ends anchored to the bridging conductor member 66. The structure of the scanner switch for the other circuit board 12 is the same as the above described scanner switch of circuit board 10.

When the wiping contacts 60, 62, and 64 are in their starting positions, as shown in FIG. 2, there is a circuit completed from terminal 37 through the leads 41 and 43 to the inner bus 36 of circuit board 10, contacts 60, springs 70, bridging member 66, springs 71, pins 72, switch arms 56, 58, contacts 62, 64, outer bus 38, and lead 39 to terminal 35. The terminal 35 of board 10 is connected through the connector 45 to the bus 38 of the other circuit board 12, the current thus passing through contacts 62, bridging member 66, contacts 60, bus 36 and leads 43, 41 of board 12 to the terminal 37. As previously mentioned, it is the function of the scanner switches to maintain a closed circuit during rotation of the rotary contacts 60, 62 and 64 through the entire 360 degrees of rotation. For a complete understanding of the function and utility of the scanner switches in the circuitry of a verification system, reference may be had to the pending application of Irvin W. Borutzke et al., Serial No. 55,640, filed September 13, 1960, for Printing Apparatus Control System.

What I claim is:

1. In a rotary switch mechanism, a dielectric mounting member, a bus plate mounted on said mounting member, a rotor arm mounted for rotation over a broadside surface of said plate about an axis substantially perpendicular thereto, a fixed contact member mounted on said mounting member and radially spaced from the axis of rotation of said rotor arm a predetermined distance in spaced relation to said plate, a contact member movably mounted on said arm for movement relative thereto and positioned inwardly of the outer periphery of said plate to engage and wipe said plate by rotation of said rotor arm, a contact member movably mounted on said arm for movement relative thereto and spaced from the axis of rotation of said arm a distance substantially equal to said predetermined distance in position to wipe said fixed contact member by rotation of said arm, a terminal member mounted on said arm in spaced relation to said movably mounted contact members transversely of said arm, and conductive spring means electrically connecting said movably mounted contact members to said terminal member and urging said first-mentioned movably mounted contact member into wiping engagement with said plate and said second-mentioned movably mounted contact member into wiping engagement with said fixed contact member.

2. In a rotary switch mechanism, a dielectric mounting board, a bus plate mounted flat on one side of said board, a rotor arm mounted for rotation over said plate about an axis substantially perpendicular thereto, a fixed contact member mounted on said board and radially spaced from the axis of rotation of said arm a predetermined distance in spaced relation to said plate, a first conductive switch arm pivotally mounted on said rotor arm and pivotal about an axis extending longitudinally of said rotor arm, a contact member carried by said switch arm and positioned thereon within the confines of said bus plate to engage the latter, a second conductive switch arm pivotally mounted on said rotor arm and pivotal about an axis extending longitudinally of said rotor arm, a contact member carried by said second switch arm and radially spaced from the axis of rotation thereof a distance substantially equal to said predetermined distance in position to wipe said fixed contact member, a terminal member mounted on said rotor arm transversely thereof from said switch arms, and a pair of conductive springs individually connecting said switch arms electrically to said terminal member and biasing said switch arms to urge yieldingly said second-mentioned and third-mentioned contact members respectively against said bus plate and said fixed contact member.

3. In a rotary switch mechanism, a dielectric mounting board, a rotor arm mounted for rotation about an axis intersecting and substantially perpendicular to a broadside of said mounting board, an annular bus attached to the broadside of said board and extending around the axis of said rotor arm on the same side of the board as said rotor arm, a second annular bus attached to the broadside of said board and extending around said first-mentioned bus in spaced relation thereto, a pair of current conducting switch arms pivotally mounted on said rotor arm in spaced apart relation therealong, said switch arms pivotal about an axis parallel to and on one side of a radial plane containing the rotor axis, a pair of contact members respectively carried by said switch arms substantially in said plane, a terminal member carried by said rotor arm on the other side of the plane from the axis of rotation of said switch arms, and a pair of current conducting springs individually connecting said switch arms electrically to said terminal member and urging said arms in a direction maintaining wiping contact respectively between said pair of contact members and said busses.

4. In a rotary switch mechanism, a dielectric mounting board, a rotor arm mounted for rotation about an axis intersecting and substantially perpendicular to a broadside of said board, an annular bus attached flat against the broadside of said bus and extending around the axis of said rotor arm, a ring-like bus attached to the broadside of said board and extending around said first-mentioned bus in spaced relation thereto, said ring-like bus having spaced apart opposite ends, a plurality of fixed contact members distributed in two parallel rows between the ends of said ring-like bus with the contact members of one row in staggered relation to the contact members of the other row, the end ones of the rows of contact members spaced from the corresponding ends of said ring-like bus and the contact members spaced from each other by distances each less than the respective widths of said contact members, a pair of movable contact members carried by said arm in radially spaced relation, one of said pair of contact members positioned to traverse said ring-like bus and the fixed contact members of one of said rows of contact members and the other of said pair of contact members positioned to traverse said ring-like bus and the other of said row of contact members, a third movable contact member carried by said arm and engaging said annular bus member, a terminal member mounted on said arm transversely thereof from said movable contact members, and current conducting springs individually connecting said movable contact members to said bridging member and also biasing said pair of movable contact members individually against said ring-like bus and said third movable contact member against said annular bus.

References Cited in the file of this patent

UNITED STATES PATENTS

| | | |
|---|---|---|
| Re. 11,718 | Pieper et al. | Feb. 21, 1899 |
| 1,752,149 | Clurman | Mar. 25, 1930 |
| 2,171,044 | Nelsen et al. | Aug. 29, 1939 |
| 2,682,643 | Thias | June 29, 1954 |
| 2,787,713 | Aust et al. | Apr. 2, 1957 |
| 2,853,564 | Galagan | Sept. 23, 1958 |
| 2,896,033 | Hartz | July 21, 1959 |
| 2,906,838 | Deighton | Sept. 29, 1959 |